Figure 10:
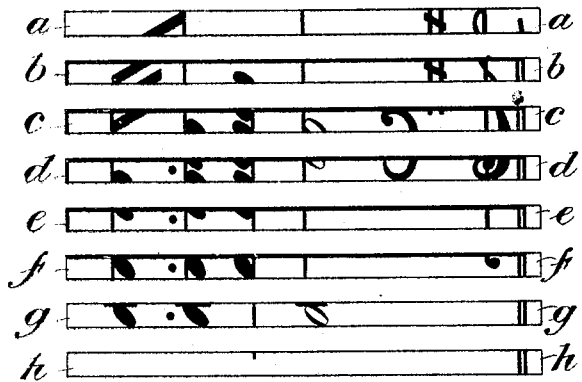

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 1.

Witnesses.
Horace Grellier
Warwick H. Williams

Inventor
John Broadhouse
per Chas. S. Woodroffe
Attorney.

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 2.

Witnesses.
Horace Grellier
Warwick H. Williams

Inventor
John Broadhouse
per Chas. S. Woodroffe
Attorney.

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 3.

Witnesses.
Horace Grellier
Warwick H. Williams

Inventor
John Broadhouse
per Chas. S. Woodroffe
Attorney.

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 4.

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 7.

No. 764,793. PATENTED JULY 12, 1904.
J. BROADHOUSE.
MATRIX OR TYPE DIE.
APPLICATION FILED JUNE 7, 1900.
NO MODEL. 8 SHEETS—SHEET 8.

Witnesses
Warwick Wms. Williams
Frederic J. Brush

Inventor
John Broadhouse
per Chas. S. Woodroffe
Attorney

No. 764,793.  Patented July 12, 1904.

UNITED STATES PATENT OFFICE.

JOHN BROADHOUSE, OF LONDON, ENGLAND.

MATRIX OR TYPE-DIE.

SPECIFICATION forming part of Letters Patent No. 764,793, dated July 12, 1904.

Application filed June 7, 1900. Serial No. 19,388. (No model.)

*To all whom it may concern:*

Be it known that I, JOHN BROADHOUSE, of London, England, have invented certain new and useful Improvements in Matrices or Type-Dies; and I do hereby declare the following to be a full, clear, and exact description of the invention, such as will enable others skilled in the art to which it appertains to make and use the same.

Improvements in the matrices or the type-dies of linotype-machines adapting them for the composition of typographic surfaces for printing music.

A linotype is a printing-bar as long as a column or page is wide and having the respective printing characters properly spaced out and justified into words standing up on one side edge thereof to form its printing edge. Linotypes are made in a linotype-machine. Of these machines there are two classes. One makes use of matrices which the operator composes and spaces into a line a little shorter than the desired length and which line the machine proceeds to justify or extend to the exact length and to cast a linotype from it. The other makes use of type-dies which the operator composes, spaces, and justifies and then causes to indent a strip of papier-mâché or the like, from which the machine casts a linotype.

The present invention relates to improvements in the matrices or the type-dies above described and which improvements adapt such matrices to serve as and such type-dies to indent strips that shall serve as molds for the printing edges of linotypes adapted to print music typographically.

The accompanying figures illustrate the application of the invention to the matrices of the Mergenthaler linotype-machine; but the term "matrices" wherever used hereinafter in this specification, as well as the respective figures, is to be understood as including type-dies, the formative cavities of the former and the indenting faces of the latter being the equivalents of each other.

Figure 1:
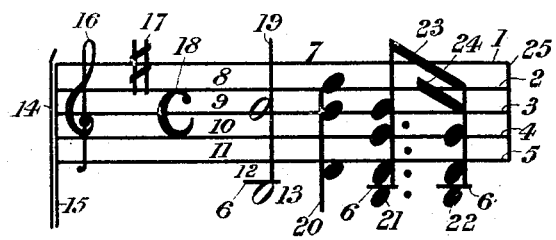
Figure 32:
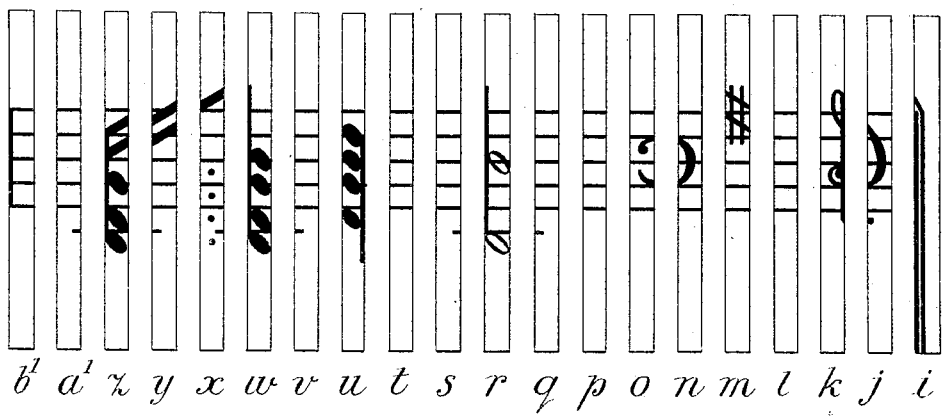
Figure 11:
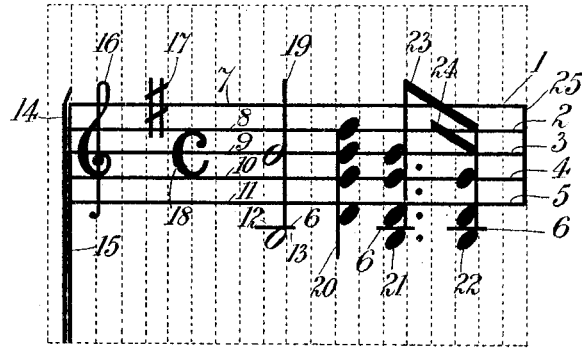

Referring to the said figures, which are to be taken as part of this specification and read therewith, Figure 1 is a representation of the first bar of the right-hand part of the organ or piano accompaniment to the chorus "Be not afraid" from Mendelssohn's "Elijah." It is the printed copy for the composed lines of matrices represented by Figs. 2 to 9 and the eight horizontal linotypes represented by Fig. 10. Figs. 2 to 9 are rear elevations of the eight composed lines of Mergenthaler linotype-matrices made according to the present invention and against which are cast the linotypes shown in Fig. 10. Fig. 10 is a plan of the eight horizontal linotypes cast from the eight composed lines of matrices shown in Figs. 2 to 9 for printing the bar of music represented in Fig. 1. Fig. 11 is a representation of the same piece of printed music as Fig. 1. Dotted lines have been added to it to show the outlines of the respective twenty vertical linotypes. Figs. 12 to 31 are rear elevations of the twenty composed lines of Mergenthaler matrices made according to the present invention and against which are cast the twenty vertical linotypes shown in Fig. 32. Fig. 32 is a plan of the twenty vertical linotypes cast against the twenty composed lines of matrices shown in Figs. 12 to 31 for printing the bar of music represented in Fig. 11.

In Fig. 1, 1 2 3 4 5 are the five staff-lines; 6 6 6, leger-lines; 7, the space above the staff-line 1; 8 9 10 11, the spaces between the respective staff-lines 1 2 3 4 5; 12, the space below the bottom staff-line 5; 13, the space below the leger-lines 6 6 6; 14, a part of a bracket; 15, a part of a bracket-line; 16, a clef character; 17, a sharp character; 18, a common-time character; 19, a chord of two minims; 20, a chord of four crotchets; 21, a chord of four dotted quavers; 22, a chord of three semiquavers; 23 24, two binders, and 25 a bar-line.

Linotype-matrices for letter-press printing vary in width according to the width of the respective characters, and there is a side wall on each side of the formative cavity which serves as the actual mold for the printing character to make with the side wall of the next matrix the white space between two adjacent characters in the printed line. According to the present invention all the matrices are of the same width and have no such side walls on each side of the formative cavity. The latter stands in a square one side of which is equal to the width of the matrix, so that all the formative cavities stand in equal squares, the side of such a square (or width of a matrix) being equal to the distance between two adjacent staff-lines plus the thickness of one staff-line.

The characters and symbols of a musical alphabet are divided by portions among these squares, any given character or symbol being divided among as many matrices as its size may require, the formative cavity for each portion standing in the position in the respective square necessary for correct registration with the corresponding formative cavity in the adjacent matrix.

It must be explained that the formative cavity of a Mergenthaler linotype-matrix is upside down when the matrix is in the casting position. This is the proper position when the linotypes to be cast from such matrices are to be read horizontally, as are the lines of a newspaper-column or of the page of a book in a language that is printed in horizontal lines. The accompanying views, Figs. 2 to 10, illustrate matrices having their formative cavities lengthwise of their length and linotypes to print horizontally. Each cavity, it will be noted, stands in a square 48, whose sides are equal to the width of a matrix.

In composing the matrices for the top row of squares in the copy shown in Fig. 1 the operator selects the matrix 43, which has a formative cavity 44, for the oblique top end of the bracket 14. He next selects one, 45, that has no cavity at all, to make the white space between the said top end of the bracket 14 and the top of the clef character 16, and so on to the end of the linotype.

Figure 2:
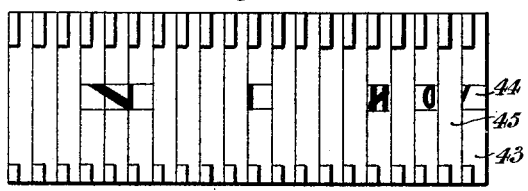
Figure 3:
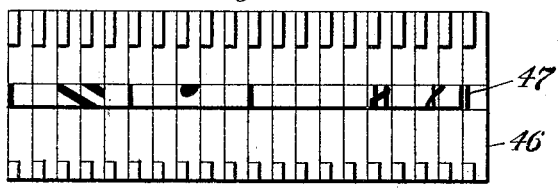
Figure 4:
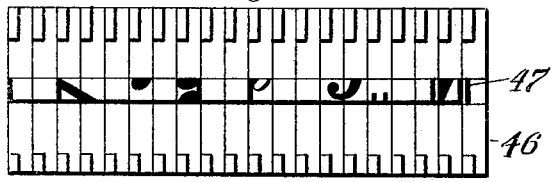
Figure 5:
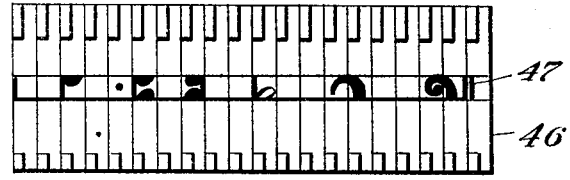
Figure 6:
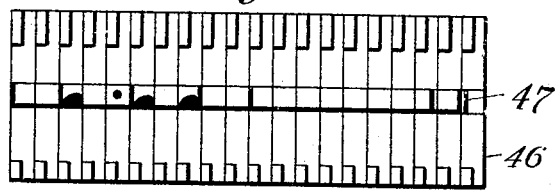
Figure 7:
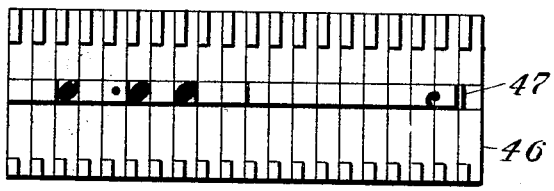
Figure 8:
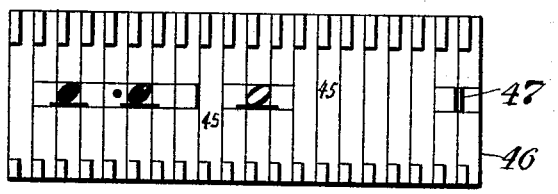
Figure 9:
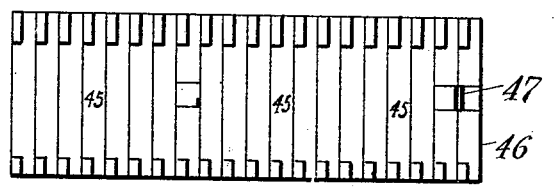

Referring to Fig. 10, $a$ is a plan of the printing edge of the linotype that the composed line of matrices of Fig. 2 will produce; $b$, that of the linotype that Fig. 3 will produce, $c$, that of the one that Fig. 4 will produce, and so on for $d\ e\ f\ g\ h$ and Figs. 5, 6, 7, 8, and 9, respectively. The plans $a$, $b$, $c$, $d$, $e$, $f$, $g$, and $h$ of Fig. 10 are drawn apart to indicate that the eight linotypes are separate pieces. If the reader will imagine them closed up to each other in a vertical direction, he will perceive that they bear upon them a proper typographical surface to produce replicas of the copy shown in Fig. 1.

Figure 12:
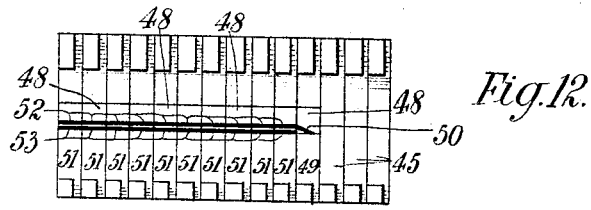
Figure 13:
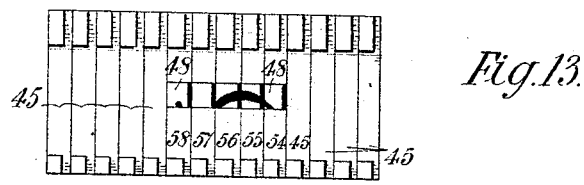
Figure 14:
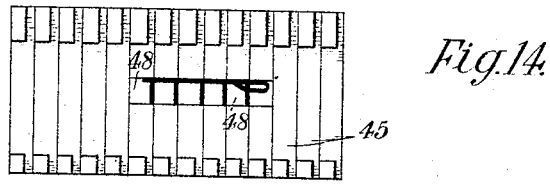
Figure 15:
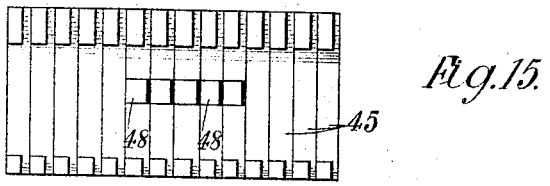
Figure 16:
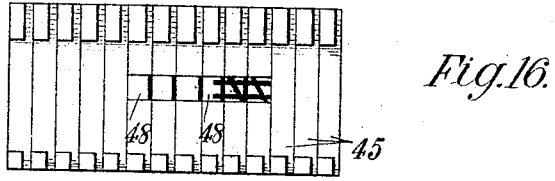
Figure 17:
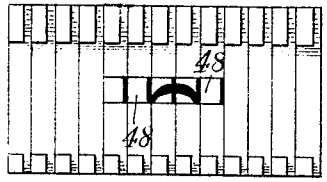
Figure 18:
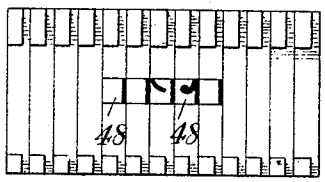
Figure 19:
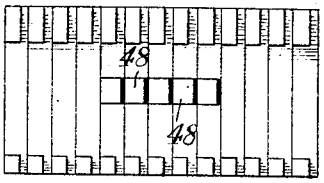
Figure 20:
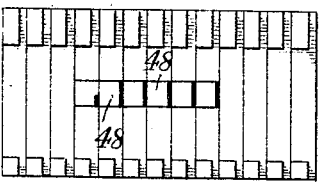
Figure 21:
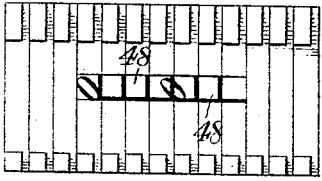
Figure 22:
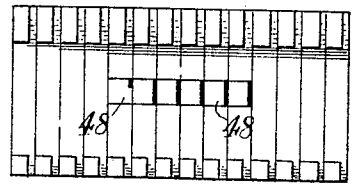
Figure 23:
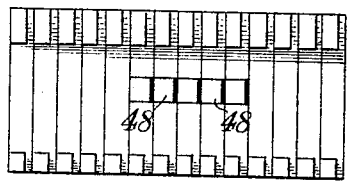
Figure 24:
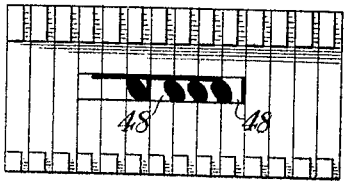
Figure 25:
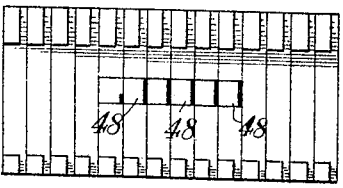
Figure 26:
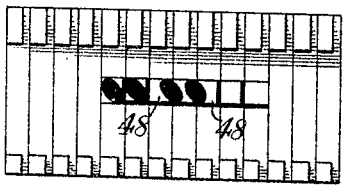
Figure 27:
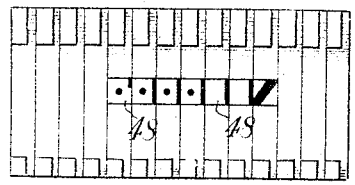
Figure 28:
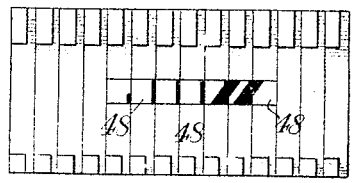
Figure 29:
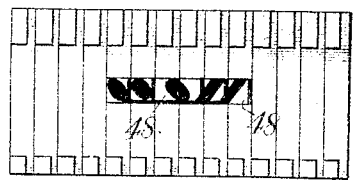
Figure 30:
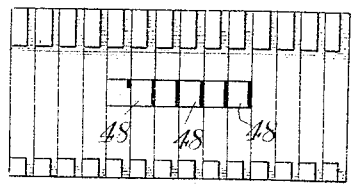
Figure 31:
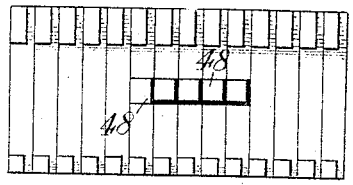

The composition by either of the two classes of linotype-machines above described may be either horizontal or vertical, as may be preferred. As a musician reads his sheet-music by a chord at a time, it is as natural to cast vertical linotypes for printing music typographically as it is to cast horizontal linotypes for letter-press printing in languages that are read horizontally. However, if the composition of the matrices is to be vertical the position of the formative cavities in the matrices must be varied by turning them through an angle of ninety degrees—that is to say, by setting them crosswise of the matrix—so that each reads lengthwise thereof in the way described in the specification of Letters Patent of the United States No. 604,404, dated May 24, 1898. This vertical composition, the matrices which it uses, and the vertical linotypes which it produces will be understood from a description of them in connection with Figs. 11 to 32. Fig. 11 does not include the bass-staff, because such inclusion is not necessary to make the invention clearly understood. At the same time it may be mentioned that in practice the operator includes on each vertical linotype the respective portions of the characters of all the staves, as many as there may be. The copy shown in Fig. 11 is intentionally the same as that used in the preceding explanation of horizontal composition in order that the reader may the more readily perceive what the horizontal and vertical systems of composition have in common and in what respects they differ from each other. It has been already explained that the matrices for vertical composition differ from those for horizontal composition in the position of the formative cavity in the respective square 48, such cavity being set crosswise of the matrix, so that it reads lengthwise thereof. This is the only difference and will be clearly understood from a comparison of the right-hand matrices of Figs. 2 to 9 with the eleven character-matrices 51 of Fig. 12. In vertical composition the operator begins each line of matrices by selecting a sufficient number of quad-matrices 45 (see Figs. 12 to 31) to make the white space 7 above the staff. It is assumed that three such matrices suffice for the purpose. Having selected this quantity for the first vertical linotype, he next selects one, 49, Fig. 12, having a formative cavity 50 for the oblique top end of the bracket 14. It will have been already noted that this cavity is turned through an angle of ninety degrees as compared with that, 44, of Fig. 2 for the same portion of the character 14. He next selects ten matrices 51, each having a formative cavity 52 for the respective portion of the vertical part of the said character 14, each of these cavities being likewise turned through an angle of ninety degrees as compared with the formative cavities of the right-hand matrices of Figs. 3 to 9. The next character in the copy is part 15 of a bracket-line. When two characters stand so close to each other in use as do a bracket 14 and a bracket-line 15, it is optional, as far as the present invention is concerned, to apportion the respective formative cavities between adjacent matrices, as shown in the first two matrices of each of the views, Figs. 3 to 9, or to have them both on the same matrices, as shown in Fig. 12, in which each of the ten matrices 51 carries in addition to the formative cavity 52 a formative cavity 53 for the respective portion of the character 15. The composition for the second linotype consists of selecting four quad-matrices 45 for the respective portion of the space 7 above the staff-line 1; one, 54, for the respective portions of the staff-line 1, the space 8, and the clef character 16; one, 55, for the respective portions of the staff-line 2, the space 9, and the clef character 16; one, 56, for the respective portions of the staff-line 3, the space 10, and the clef character 16; one, 57, for the respective portions of the staff-line 4 and space 11; one, 58, for the respective portions of the staff-line 5, the space 12, and the clef character 16, and five quad-matrices 45 for the remainder of the respective portion of the white space under the staff. That for the other eighteen linotypes proceeds in like manner. Each row of matrices as it is composed is cast from in the same way as any one of the lines of matrices for horizontal composition shown in Figs. 2 to 9.

Referring to Fig. 32, $i$ to $a'$ are plans of the vertical linotypes that the composed lines of matrices represented by Figs. 12 to 31 will respectively produce. These twenty plans are drawn apart to indicate that the twenty linotypes are separate pieces and in a vertical position to show that they are to be used in a vertical position. If the reader will imagine them closed up to each other in a horizontal direction, he will perceive that they constitute a proper typographical surface to produce replicas of the copy. (Shown by the full lines of Fig. 11.)

As all the matrices in the font are of the same thickness, there will be a perfect self-maintaining register whether the composition be horizontal or vertical, and this will obviate the necessity of either spacing or justification between the matrices; but a filling-up "en" or "em" quad may be inserted at either or each end, if desired.

The number of characters or symbols in a font will exceed the number in an ordinary letter-press font. The magazine accommodation of any composing-machine equipped with the improved type-dies or matrices may be extended by any of the known means of increasing the number of fonts under the control of an operator at one time, such as by multiplying the number of magazines or by multiplying the number of characters or symbols on each type on the number of formative cavities in a matrix.

I claim—

A font of matrices of the same size throughout the font and bearing among them the portions of the characters and symbols of a musical alphabet, the said portions standing in equal squares.

In testimony that I claim the foregoing as my invention I have signed my name in presence of two subscribing witnesses.

JOHN BROADHOUSE.

Witnesses:
  CHAS. S. WOODROFFE,
  H. A. WARNER.